US010083139B1

United States Patent
Chun et al.

(10) Patent No.: US 10,083,139 B1
(45) Date of Patent: Sep. 25, 2018

(54) SYSTEM AND METHOD FOR CHANGING A SLAVE IDENTIFICATION OF INTEGRATED CIRCUITS OVER A SHARED BUS

(71) Applicant: QUALCOMM INCORPORATED, San Diego, CA (US)

(72) Inventors: Christopher Kong Yee Chun, Austin, TX (US); Chris Rosolowski, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/618,062

(22) Filed: Jun. 8, 2017

(51) Int. Cl.
*G06F 13/40* (2006.01)
*G06F 13/364* (2006.01)
*G06F 1/26* (2006.01)
*G06F 3/06* (2006.01)
*G06F 13/42* (2006.01)

(52) U.S. Cl.
CPC .............. *G06F 13/364* (2013.01); *G06F 1/26* (2013.01); *G06F 3/0659* (2013.01); *G06F 13/404* (2013.01); *G06F 13/4282* (2013.01)

(58) Field of Classification Search
CPC .. G06F 13/404; G06F 13/364; G06F 13/4282; G06F 13/362; G06F 2213/0016; G06F 3/1293; G06F 13/0661; G06F 12/1433
See application file for complete search history.

(56) References Cited

U.S. PATENT DOCUMENTS

| | | | |
|---|---|---|---|
| 8,595,366 B2 | 11/2013 | Mukundan et al. | |
| 9,229,730 B2 | 1/2016 | Amann et al. | |
| 2006/0253615 A1* | 11/2006 | Flach | G06F 13/385 710/3 |
| 2013/0054933 A1* | 2/2013 | Fister | G06F 12/0661 711/203 |
| 2015/0120975 A1 | 4/2015 | Sengoku | |
| 2015/0193298 A1 | 7/2015 | Ngo et al. | |
| 2015/0199279 A1 | 7/2015 | Haugan | |
| 2015/0212957 A1* | 7/2015 | Yuan | B41J 2/17546 710/3 |
| 2017/0046292 A1* | 2/2017 | Teuke | G06F 12/0646 |

* cited by examiner

*Primary Examiner* — Ernest Unelus
(74) *Attorney, Agent, or Firm* — Smith Tempel Blaha LLC

(57) ABSTRACT

Systems and methods are disclosed resetting a slave identification (SID) of an integrated circuit (IC). An exemplary method comprises determining that a plurality of ICs in communication with a shared bus have the same SID, the shared bus operating in a master/slave configuration. A common memory address of the ICs is identified, where data stored in the common memory address is different for a first IC and a second IC. Each of the ICs receives over the shared bus a new SID value and match data. The ICs compare the match data with the data stored in the common memory address. If the match data is the same as the data in the common memory address, the SID is changed the received new SID value.

30 Claims, 6 Drawing Sheets

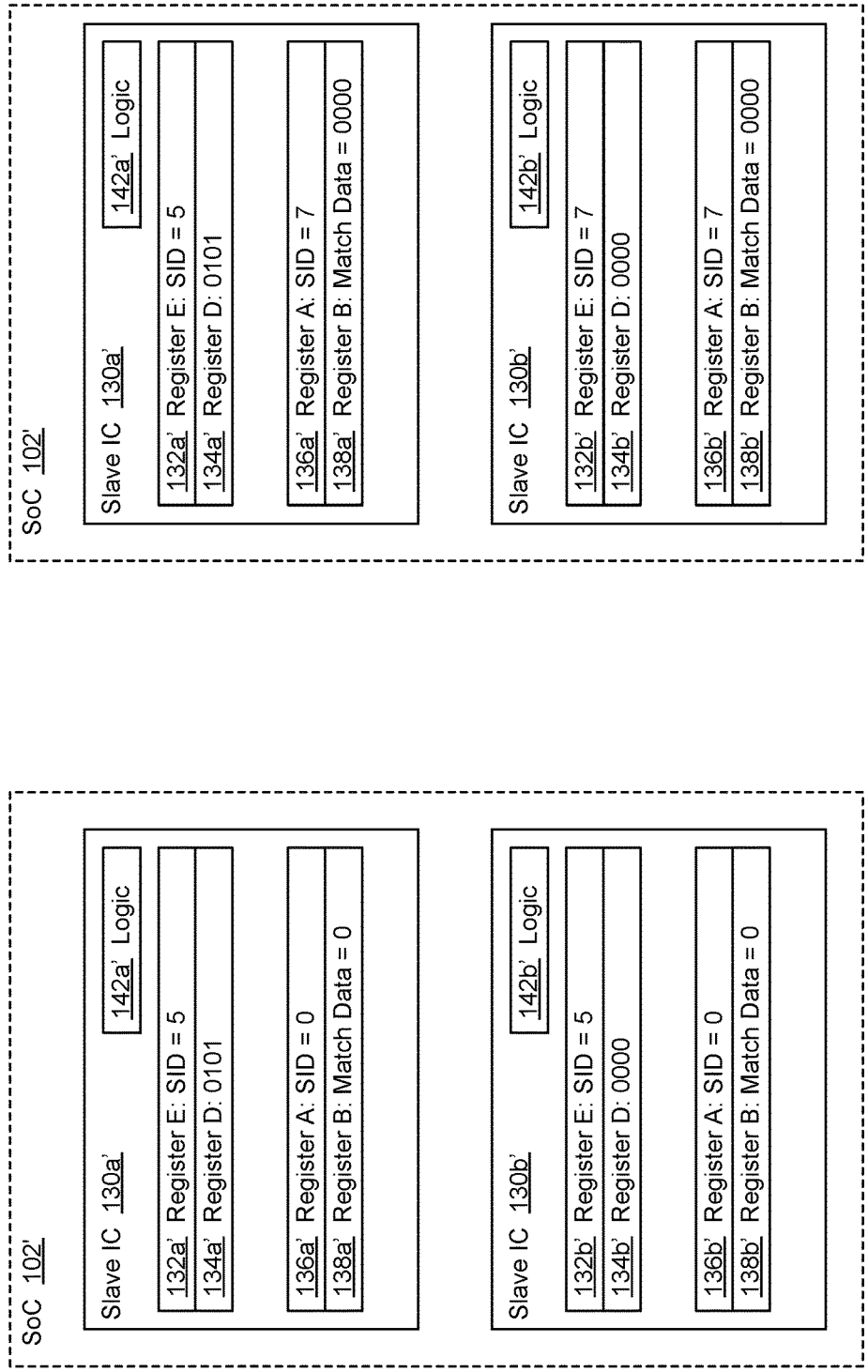

US 10,083,139 B1

SYSTEM AND METHOD FOR CHANGING A SLAVE IDENTIFICATION OF INTEGRATED CIRCUITS OVER A SHARED BUS

DESCRIPTION OF THE RELATED ART

Computing devices comprising at least one processor coupled to a memory are ubiquitous. Computing devices may include personal computing devices (PCDs) such as desktop computers, laptop computers, portable digital assistants (PDAs), portable game consoles, tablet computers, cellular telephones, smart phones, and wearable computers. In order to meet the ever-increasing processing demands of users, PCDs increasingly incorporate multiple processors or cores sending instructions or commands to one or more integrated circuit components (ICs).

In such PCDs one or more processors or cores may communicate with multiple ICs via one or more common or multi-drop bus. An example of such a common bus is power management bus where one or more processors may communicate with multiple power management ICs (PMICs) of the PCD via a common system power management interface (SPMI). The processors or cores communicate with the PMICs in a master/slave relationship where each PMIC has a specific slave identification (SID) to allow the processor to send instructions to a specific PMIC.

However, in instances where multiple identical ICs (such as PMICs) are implemented in a chip set, the identical ICs will be manufactured with the same SID. To allow communications with the multiple identical ICs, some prior art systems require a dedicated external pin connected to the printed circuit board (sometimes called an option pin) to allow a unique SID to be set for each of the identical ICs. However, this wastes pins that could be used for other purposes. Other solutions have included manufacturing multiple different versions of the same IC, each with a separate SID. However this unnecessarily increases design and manufacturing costs.

Accordingly, there is a need for improved systems and methods to reset an SID in an IC when multiple identical ICs share a common bus, without the use of external pins dedicated to the SID.

SUMMARY OF THE DISCLOSURE

Apparatuses, systems, methods, and computer programs are disclosed for resetting a slave identification (SID) for multiple identical integrated circuits (ICs) over a shared bus operating in a master/slave configuration. An exemplary method comprises determining that a plurality of ICs in communication with the shared bus have the same SID. The exemplary method further includes identifying a common memory address of the plurality of ICs, where data stored in the common memory address of a first of the plurality of ICs is different than data stored in the common memory address of a second of the plurality of ICs.

Each of the plurality of ICs receives over the shared bus a new SID value and match data. The ICs each compare the received match data with the data stored in the common memory address. If the comparison determines that the received match data matches, or is the same, as the data stored in the common memory address, the SID of that IC is changed to the received new SID value.

In another embodiment, an exemplary system comprises a shared bus of the computing device operating in a master/slave configuration. The system also comprises a plurality of ICs in communication with the shared bus. The exemplary system further comprises logic of the computing device. The logic of the computing device is configured to determine that the plurality of ICs have the same SID, and to identify a common memory address of the plurality of ICs where data stored in the common memory address of a first of the plurality of ICs is different than data stored in the common memory address of a second of the plurality of ICs.

In the exemplary system, each of the plurality of ICs is configured to: receive a new SID value from the logic of the computing device over the shared bus; receive match data from the logic of the computing device over the shared bus; and compare the received match data with the data stored in the common memory address. Based on the comparison, if the received match data is the same as the data stored in the common memory address, that IC changes the SID to the received new SID value.

BRIEF DESCRIPTION OF THE DRAWINGS

In the Figures, like reference numerals refer to like parts throughout the various views unless otherwise indicated. For reference numerals with letter character designations such as "102a" or "102a", the letter character designations may differentiate two like parts or elements present in the same Figure. Letter character designations for reference numerals may be omitted when it is intended that a reference numeral to encompass all parts having the same reference numeral in all Figures.

FIG. 3A is a block diagram showing aspects of another embodiment of the slave ICs of the system of FIG. 1 prior to resetting of the SID of one of the slave ICs;

FIG. 3B is a block diagram showing aspects of the exemplary slave ICs of FIG. 3A while the SID of one of the slave ICs is reset over the shared bus;

DETAILED DESCRIPTION

Figure 1:
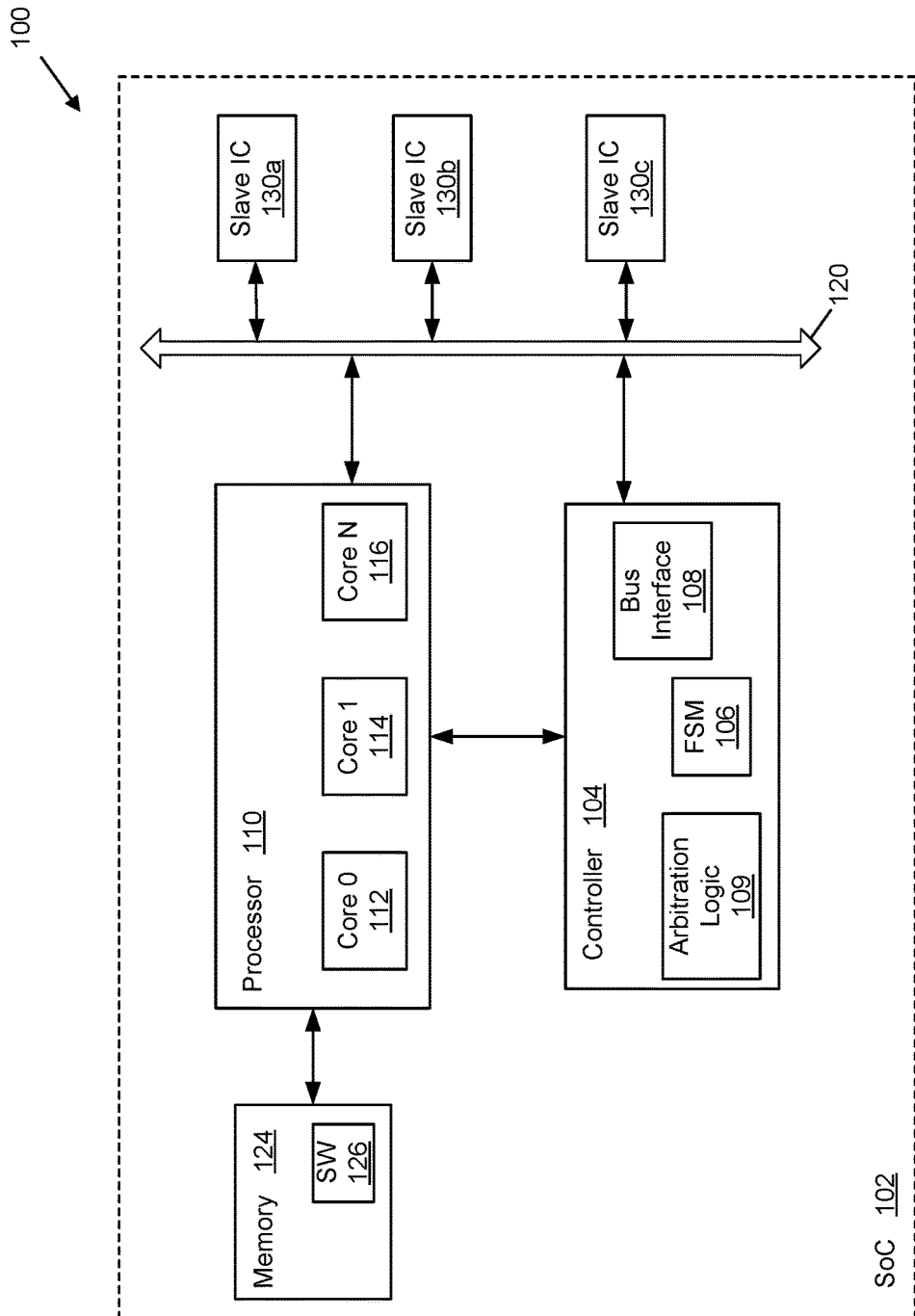
FIG. 1 is a block diagram of an embodiment of a system that allows resetting a slave identification (SID) for multiple identical integrated circuits (ICs) sharing a common bus.

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "computing device" is used to mean any device implementing a processor (whether analog or digital) in communication with a memory, such as a desktop computer, gaming console, or server. A "computing device" may also be a "portable computing device" (PCD), such as a laptop computer, handheld computer, or tablet computer. The terms PCD, "communication device," "wireless device," "wireless telephone", "wireless communication device," and "wireless handset" are used interchangeably herein. With the advent of third generation ("3G") wireless technology, fourth generation ("4G"), Long-Term Evolution (LTE), etc., greater bandwidth availability has enabled more portable computing devices with a greater variety of wireless capabilities. Therefore, a portable computing device may also include a cellular telephone, a pager, a smartphone, a navigation device, a personal digital assistant (PDA), a portable gaming console, a wearable computer, or any portable computing device with a wireless connection or link.

In order to meet the ever-increasing processing demands placed on PCDs, within the small form factors, PCDs increasingly incorporate multiple processors or cores (such as central processing units or "CPUs") running various threads in parallel. Such PCDs often include common or shared buses over which one or more of the processors or cores may communicate with various additional components of the PCD, including various integrated circuits (ICs).

These communications over the common or shared bus may be a master/slave relationship with one or more processors or cores (or software executed by the cores/processors) being the master to one or more slave ICs. In such master/slave arrangements with the common bus, commands or instructions sent from the master are received by each of the slave ICs. However, the command or instruction includes a slave identification (SID) identifying the particular IC (or ICs) should execute the command or instruction.

An example of a common or shared bus is a system power management bus or interface (SPMI) shared by multiple power management ICs (PMICs). It is increasingly common for PCDs to implement two or more identical PMICs connected to the SPMI, in a chip-set for instance, with each identical PMIC manufactured with the same SID. Resetting the SIDs for the identical PMICs previously required a dedicated external pin connected to the printed circuit board (PCB), manufacturing multiple versions of the PMIC with different SIDs, or some sort of address translation by the master for each command or instruction sent to the PMICs. Such solutions are cumbersome, waste pins unnecessarily, increase design or manufacturing costs, and/or hamper operation of the system.

The present systems and methods allow for the SIDs for one or more identical ICs (such as identical PMICs on an SPMI) to be reset at boot over the shared bus without need for external pins dedicated to the SID, and also without the need to manufacture multiple versions of the same IC with different preset SIDs. The present systems and methods may also be implemented on existing ICs, without the need to entirely redesign or create new ICs, resulting in considerable cost savings.

Although the discussion herein is in terms of power management buses such as SPMI and PMICs for brevity's sake, the concepts, systems and methods disclosed herein are equally applicable to the inter-integrated circuit (I2C) bus, or the I3C bus, or any other multi-drop. Additionally, although discussed herein in relation to PCDs, the systems and methods herein—and the considerable savings made possible by the systems and methods—are applicable to any computing device.

FIG. 1 is a block diagram of an embodiment of a system 100 that allows resetting an SID for one or more multiple identical ICs sharing a common bus. In an embodiment, the system 100 may be implemented on, or as a portion of, a system-on-a-chip (SoC) 102 of a computing device. The system 100 may be implemented in any computing device, including a personal computer, a workstation, a server, or a PCD. The system 100 may also be implemented in a computing device that is a portion/component of another product such as an appliance, automobile, airplane, construction equipment, military equipment, etc.

As illustrated in the embodiment of FIG. 1, the system 100 includes a controller 104 electrically coupled to one or more processor 110 which may include multiple cores 112, 114, 116. The controller 104 and processor 110 are also electrically coupled to one or more slave ICs 130a-130c via a shared interconnect or bus 120. In an embodiment the shared interconnect or bus 120 comprises a serial communication interface bus or interconnect, such as a system power management interface (SPMI) bus. The illustrated slave ICs 130a-130c are identical, and have been manufactured with the same SID. In an embodiment, the slave ICs 130a-130c may be PMICs coupled to the SPMI.

The controller 104 may comprise various components including arbitration logic 109 configured to arbitrate or decide which among the various command or instructions from the software 126 and/or cores 112, 114, 116 to forward over the bus 120. The controller 104 also include other components including a finite state machine FSM 106 and Bus Interface 108.

Processor 110 may be a central processing unit (CPU) comprised of multiple processing components or cores, such as core 0 112, core 1 114, and core N 116 illustrated in FIG. 1. As will be understood, additional processing components may also be included in the SoC 102, either included in processor 110 or external to processor 110. Processor 110 and or cores 112-116 are also electrically coupled with memory 124 which may be a system memory. Memory 124 may contain or store software 126 comprising code, task, or instructions executed by one or more of processor 110/cores 112-116.

One or more of software 126, processor 110, and/or cores 112-116 may act as a master and communicate with slave ICs 130a-130c over bus 120, either directly or through controller 104. Such communication with slave ICs 130a-130c may include instructions, tasks, signals, commands, etc. over the common bus 120, which will be received by all of slave ICs 130a-130c. The communication will also include the SID of the particular slave ICs 130a-130c for which the communication is intended—e.g. the slave ICs 130a-130c to execute the instruction or task sent, store the information sent, act on the signal sent, etc.

Since the slave ICs 130a-130c have been manufactured with the same SID, the present systems and methods allow the SIDs of one or more of slave IC 130a-130c to be reset at boot-up of the SoC 102 (or PCD) using the shared bus 120. The present systems and methods take advantage of the fact that even among identically manufactured ICs, one or more register address of the identical slave ICs 130a-130c installed on the SoC 102 will contain unique data, different from the data in the same register address in the other slave ICs. 130a-130c. By identifying the register address of the ICs with the unique data, and the unique data contained within that address, the present systems and methods allow for resetting the SIDs of slave ICs 130a-130c over the shared bus 120 at boot-up so that each of slave ICs 130a-130c have a unique SID during operation.

It will be understood that FIG. 1 is illustrative. As a result, the system 100 may include more, fewer, or different components than those illustrated in FIG. 1. Similarly, the controller 104 processor 110, and memory 124 may include more, fewer, or different components than those shown in FIG. 1.

Figures 2A, 2B:
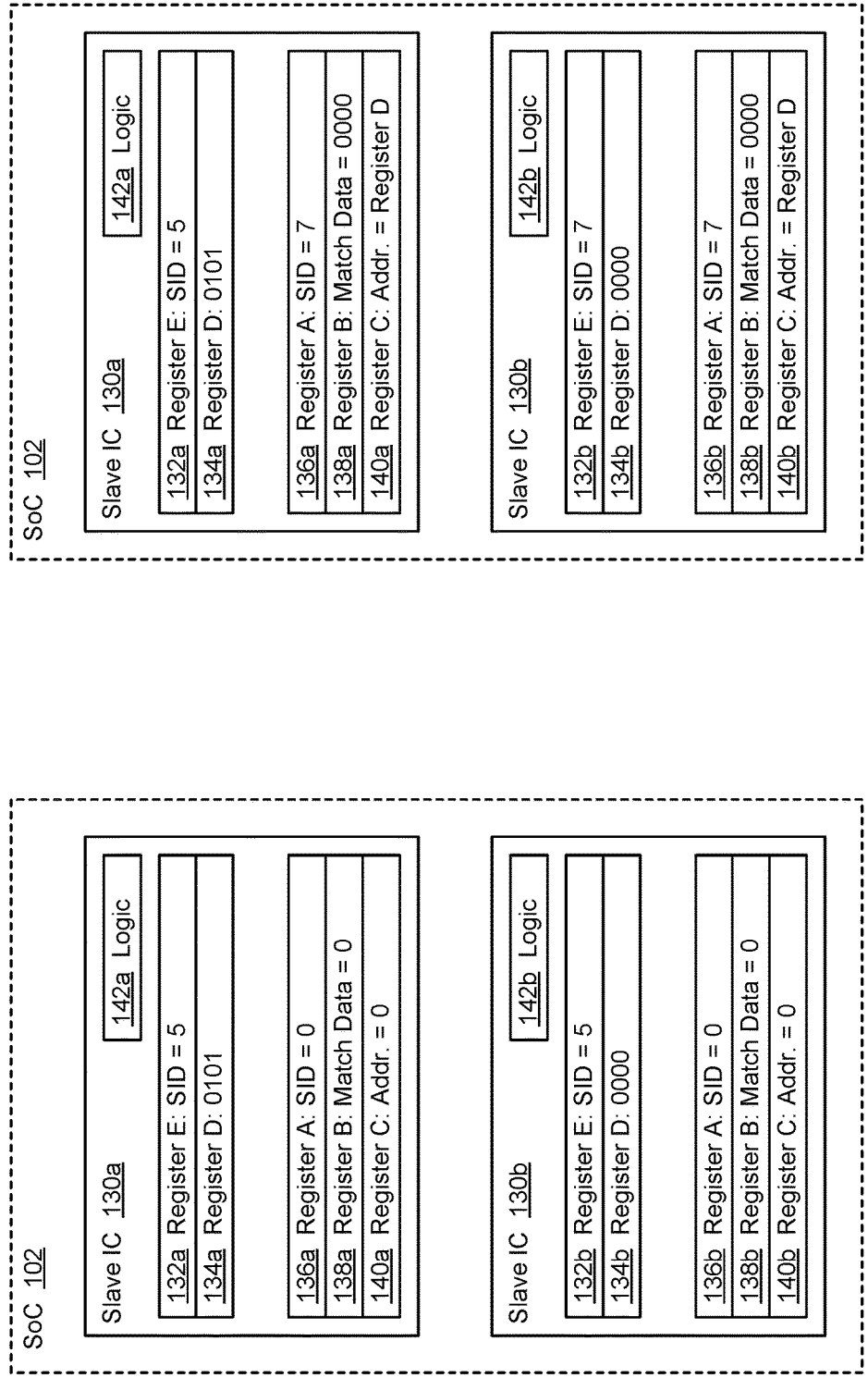
FIG. 2A is a block diagram showing aspects of exemplary slave ICs of the system of FIG. 1 prior to resetting of the SID of one of the slave ICs over a shared bus.
FIG. 2B is a block diagram showing aspects the exemplary slave ICs of FIG. 2A while the SID of one of the slave ICs is reset over the shared bus.

Turning to FIGS. 2A-B, aspects of exemplary slave ICs 130a and 130b of the SoC 102 of system of FIG. 1 are illustrated. FIG. 2A illustrates slave ICs 130a and 130b prior to resetting of the SIDs over the shared bus 120 (see FIG. 1), such as during boot up. FIG. 2B illustrates slave ICs 130a and 130b while the SID of slave IC 130b (in this example) is being reset over the shared bus 120 (see FIG. 1), such as during boot up. Although only slave ICs 130a-130b are illustrated, the discussion of FIGS. 2A-2B is equally applicable to the system 100 of FIG. 1 with three slave ICs 130a-130c, or any system with N number of slave ICs, whether identical or not (not illustrated).

As illustrated in FIG. 2A, slave ICs 130a and 130b each contain registers 132a-140a and 132b-140b, respectively. In both slave IC 130a and slave IC 130b, Register E (132a and 132b) is the register containing the SID. As slave IC 130a and slave IC 130b are identical ICs, each has the same SID, 5 in the illustrated embodiment. Register E 132a, 132b is a predetermined register containing the SID, which was set at manufacture, and which may be reset during boot in the manner discussed below to ensure that each of slave IC 130a and slave IC 130b has a different SID during operation of the SoC 102.

Register D (134a of slave IC 130a and 134b of slave IC 130b) is a register that is identified as containing different information—i.e. the data stored in Register D 134a of slave IC 130a is known to be different the data stored in Register D 134b of slave IC 130b. As illustrated in FIG. 2A the data stored in slave IC 130a Register D 134a ("0101") is different than the data stored in slave IC 130a Register D 134b ("0000").

In an embodiment, Register D 134a, 134b may be predetermined dedicated register into which different data is stored at manufacture to differentiate slave ICs 130a and 130b (or to differentiate any number of slave ICs). However, it is not necessary that Register D 134a, 134b be either predetermined or a dedicated register.

Instead, in other embodiments, Register D 134a, 134b is not a dedicated register, but may be any register address common to slave ICs 130a and 130b that is identified as containing different data for the slave ICs 130a and 130b. This identification of different data in Register D 134a, 134b may be made dynamically, such as by software during boot up, or statically before boot up, and may be based on configuration information or other information known or determined about the slave ICs. 130a, 130b.

By way of example, Register D 134a, 134b may in some implementations be a register address of both slave IC 130a and 130b identified as containing a part number that is different for slave IC 130a than for slave IC 130b. By way of another example, Register D may in some implementations be a register address of both slave IC 130a and 130b containing power on sequence (PON sequence) data where it is known that the PON sequence data for slave IC 130a is different than the PON sequence data for slave IC 130b. Thus, Register D 134a, 134b can be any register address common to both slave IC 130a and 130b where it is known, or can be determined, that the data contained at the common address is different for the two slave ICs 130a and 130b, even though slave ICs 130a and 130b may have been manufactured identically.

The illustrated embodiment of slave ICs 130a and 130b also contain three registers, Register A (136a/136b), Register B (138a/138b), and Register C (140a/140b) used during boot up to change the SID of one of slave IC 130a or 130b. Register A 136a/136b will store the new SID, and as illustrated in FIG. 2A is either an empty register or is a predetermined register that has been set to a value of 0 during manufacture.

Register B 138a/138b will store "match data" or data that will be used or compared by slave ICs 130a and 130b to determine whether to change the SID. As illustrated in FIG. 2A Register B 138a/138b is also either an empty register or is a predetermined register that has been set to a value of 0 during manufacture.

Register C 140a/140b will store the address of the register to which the slave ICs 130a and 130b will compare the "match data" to determine whether to change the SID. As illustrated in FIG. 2A Register C 140a/140b is also either an empty register or is a predetermined register that has been set to a value of 0 during manufacture.

Slave ICs 130a and 130b also contain logic 142a/142b. In an embodiment, logic 142a/142b may be configured to perform the comparison of the "match data" received at Register B 138a/138b to the data stored at the address received at Register C 140a/140b in order to determine whether to change the SID. In such embodiments, logic 142a/142b may be triggered to operate and/or perform the comparison of the "match data" in response to a write or read command received for Register B 138a/138b or Register C 140a/140b as discussed below.

Turning to FIG. 2B, aspects of the slave ICs 130a and 130b during an exemplary operation to change the SID in one of slave ICs 130a and 130b (slave IC 130b in this example) over the shared bus 120 (see FIG. 1) is illustrated.

As noted, the system may operate to reset SIDs at boot up of the SoC 102 or the PCD. In some embodiments the system may operate to reset SIDs only the first time power is applied to the SoC 102, while in other embodiments the system may operate to reset SIDs any time that the SoC 102 is powered up.

In the embodiment of FIG. 2B, during boot up and before the SoC 102 is operational, slave IC 130a and slave IC 130b both receive over the shared bus 120 a write command for Register A 136a/136b. The write command may be received over the shared bus 120 in an embodiment from software and/or a processing component performing the boot up. The write command specifies a new SID of 7 which is written to Register A 136a/136b of both slave IC 130a and 130b as illustrated in FIG. 2B.

In the embodiment of FIG. 2B, slave IC 130a and slave IC 130b also both receive over the shared bus 120 a write command for Register B 138a/138b. This write command may be received along with the write command for Register A 136a/136b in some embodiments, or subsequent to the write command for Register A 136a/136b in other embodiments. Regardless of when received, the write command for Register B 138a/138b contains the "match data" that will be used by slave IC 130a and 130b to determine whether to change their respective SIDs. In the embodiment of FIG. 2B, the received "match data" is "0000" which is written into Register 138a/138b of both slave IC 130a and slave IC 130b.

In the embodiment of FIG. 2B, slave IC 130a and slave IC 130b also both receive over the shared bus 120 a write command for Register C 140a/140b. This write command may be received along with the write command for Register B 138a/138b in some embodiments, or subsequent to the write command for Register B 138a/138b in other embodiments. Regardless of when received, the write command for Register C 140a/140b contains an address. In the embodiment of FIG. 2B, the received address is the address of Register D 134a/134b.

As result of receiving one or more of the write commands, logic 142a/142b of both slave IC 130a and 130b operates to compare the received "match data" in Register B 138a/138b to the data stored at the received address stored in Register C 140a/140b. Since the received address is the address of (or a pointer to) Register D 134a/134b, both slave IC 130a and slave IC 13b compare the "match data" to the data stored in their respective Register D 134a/134b.

For IC 130a, the "match data" of "0000" in Register B 138a is compared to the "0101" of Register D 134a. Since the comparison does not result in a match, logic 142a of IC 130a does nothing to the SID for slave IC 130a—in other words, the SID stored in Register E 132a of slave IC 130a is not changed.

For IC 130b, the "match data" of "0000" in Register B 138b is compared to the "0000" of Register D 134b. Since the comparison results in a match, logic 142b of IC 130b caused the SID for slave IC 130b to change. The received SID in Register A 136b (7 in this example) is written to Register E 132b, effectively changing the SID for slave IC 130b.

In this manner the SID for identical ICs may be changed over a shared bus, such as an SPMI, without need for external pins between each IC and the PCB. Note that although two slave ICs 130a-130b are illustrated in FIGS. 2A-2B, the SIDs may be changed for any number of ICs over the common bus in the same manner discussed above. In such cases, the above steps may be repeated N−1 times of N ICs with a new SID and different "match data" sent each iteration in order to ensure that all N of the ICs have a different SID during operation of the SoC. Note that for such embodiments, it is not necessary that the same Register D—the common address of the identical ICs containing different data—be used for each iteration of all of the comparisons.

It will also be understood that the number and arrangement of the registers of slave ICs 130a and 130b as well as the number and sequence of commands received by the slave ICs 130a and 130b to reset the SID may differ in various embodiments. For example, FIGS. 3A-3B illustrate aspects of another embodiment of exemplary slave ICs 130a and 130b of the SoC 102 of system of FIG. 1. FIG. 3A illustrates slave ICs 130a' and 130b' prior to resetting of the SIDs over the shared bus 120 (see FIG. 1), such as during boot up. FIG. 3B illustrates slave ICs 130a' and 130b' while the SID of slave IC 130b' (in this example) is being reset over the shared bus 120 (see FIG. 1), such as during boot up.

Again, although only slave ICs 130a'-130b' are illustrated, the discussion of FIGS. 3A-3B is equally applicable to the system 100 of FIG. 1 with three slave ICs 130a-130c, or any system with N number of slave ICs, whether identical or not (not illustrated). Turning to FIGS. 3A-3B, slave ICs 130a' and 130b' are identical to slave IC 130a and 130b of FIGS. 2A-2B with the exception that in FIGS. 3A-3B the identity of Register D 134a'/134b'—the common register address containing different data for slave IC 130a' than is contained in the same address for slave IC 130b'—is known. For example, it may be known that Register D 134a'/134b' of FIGS. 3A-3B is a register containing a part number unique for each of the identical ICs.

As a result, there is no need for Register C 140a/140b discussed above in FIG. 2A. Instead, slave ICs 130a' and 130b' of FIGS. 3A-3B only use Register A 136a'/13b' to receive and store the new SID and Register B 138a'/138b' to receive and store the "match data." Thus, in FIG. 3B, receiving the command writing the "match data" to Register B 138a'/138b' of slave IC 130a' and slave IC 130b' triggers logic 142a'/142b'.

Logic 142a' of slave IC 130a' compares the received "match data" stored at Register B 138a' to the data stored in Register D 134a' in the same manner discussed above for FIG. 2B, with the same result as FIG. 2B—the SID in Register E 132a' is not changed in the example of FIG. 3B. Similarly, logic 142b' of slave IC 130b' compares the received "match data" stored at Register B 138b' to the data stored in Register D 134b' in the same manner discussed above for FIG. 2B, with the same result as FIG. 2B—the SID in Register E 132b' of slave IC 130b' is changed to the value stored in Register a 136b'.

As will be understood, variations or additional embodiments for the structure and operation of the slave ICs 130a/130b and 130a'/130b' are possible beyond the illustrations of FIGS. 2A-2B and 3A-3B, and such variations or additional embodiments are considered to be within the scope of this disclosure.

Figure 4:
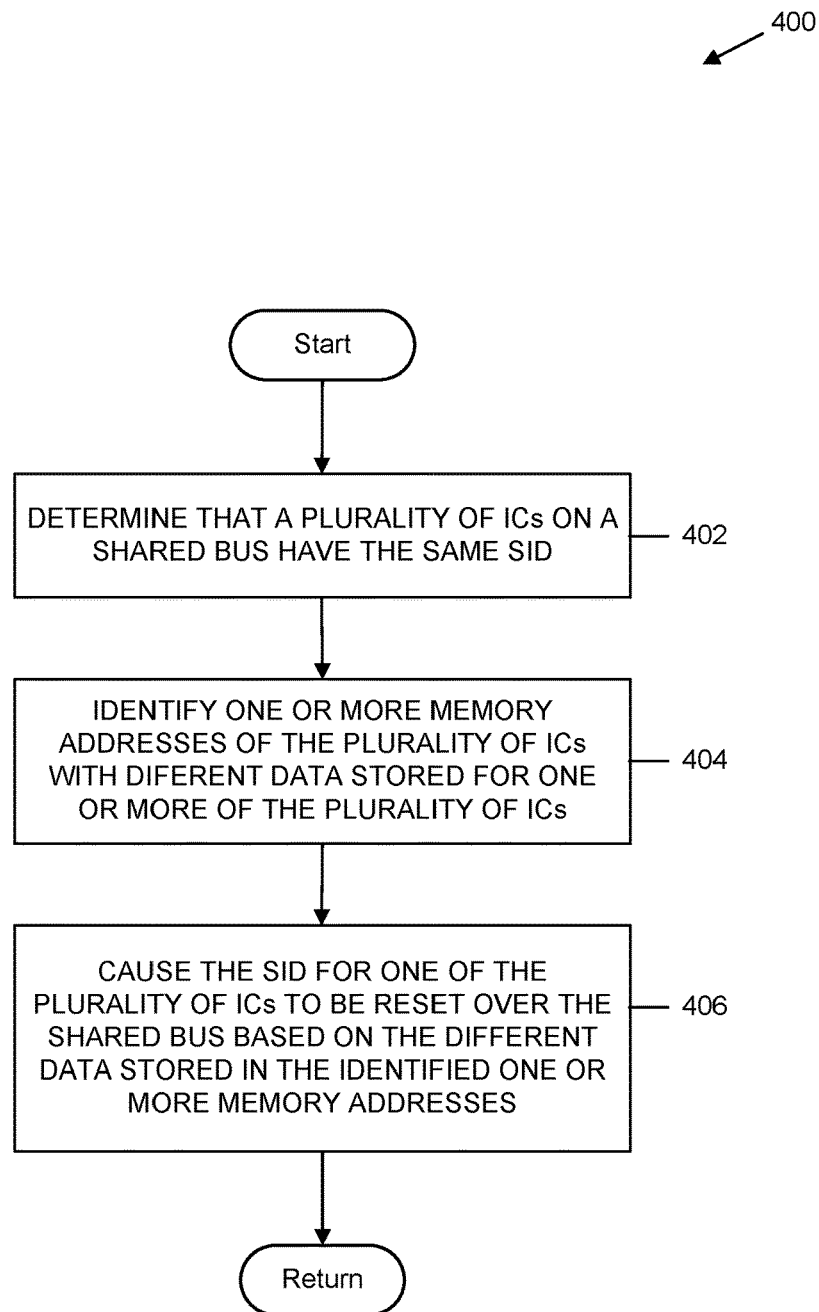
FIG. 4 is a flowchart illustrating an exemplary method for resetting the SIDS for one or more identical ICs sharing a common bus.

FIG. 4 is a flowchart illustrating an exemplary embodiment of a method 400 for resetting the SIDs for one or more identical ICs using a common bus shared by the ICs. Method 400 may be implemented on a system such as system 100 of FIG. 1 with identical slave ICs 130a-130c sharing common bus 120 where communications over bus 120, such as from software 126, are received by each of the slave ICs 130a-130c. Although discussed in terms of identical ICs, method 400 is equally applicable to instead, or to additionally, allow configuration of non-identical ICs on the shared bus that have been preset with the same SID as another IC on the shared bus.

Using the example of the system 100 of FIG. 1, the steps of the illustrated exemplary method 400 may be performed in an embodiment by one or more of software 126, processor 110, core 0 112, core 1 114, or core N 116 operating to boot up the SoC 102. Booting up the SoC 102 in some embodiments may comprise the initial boot when power is applied to the SoC 102 for the first time and the SoC 102 and various components thereon are initially configured. In other embodiments booting up the SoC 102 may comprise any time that power is applied or reapplied to the SoC 102, such that method 400 is performed every time power is removed from the SoC 102 (such as when a battery from a PCD is removed).

Method 400 begins in block 402 by determining that multiple ICs sharing a common bus, such as multiple PMICs on a SPMI bus, have the same SID. This determination may include in some embodiments all of the ICs on the shared bus (whether or not the ICs are identical) that have been preset at manufacture to have the same SID. This determination in block 402 and/or the identification the multiple ICs with the same SID may be based on configuration information about the ICs typically provided by the manufacturer of the IC to allow configuration of the IC into a PCD or SoC.

The determination and/or identification of the ICs with the same SID in block 402 may be made during boot up by logic in the software and/or processing component performing the boot up. As mentioned, block 402 may be performed only once during a first boot up and/or configuration of the SoC or PCD. In other embodiments block 402 may be performed every time the SoC or PCD is re-powered as a way to prevent SID conflicts for new ICs that may have been be added after the initial boot up or configuration of the SoC or PCD.

Method 400 continues to block 404 where one or more common memory addresses are identified for the multiple ICs determined in block 402, where it is known that the multiple ICs have different data stored in the one or more common memory address. The one or more common memory addresses identified in block 404 may comprise the Register D (134a of slave IC 130a and 134b of slave IC 130b) discussed for FIGS. 2A-2B and 3A-3B above—i.e. where the data stored in Register D 134a of slave IC 130a is known to be different the data stored in Register D 134b of slave IC 130b.

In an embodiment, the one or more common memory addresses identified in block 404 may be predetermined dedicated memory address(es) into which different data is stored at manufacture to differentiate identical ICs. In other embodiments, the memory addresses identified in block 404 may not be a dedicated address used to differentiate ICs, but may instead be any register address common to two or more of the ICs that is identified as containing different data for the ICs. This identification in block 404 may be made dynamically, such as by software and/or a processing component during boot up, or statically before boot up.

The identification in block 404 may be based on configuration information or other information known or determined about the ICs either from manufacture of from the installation of the ICs into the SoC or PCD. For example, the identification in block 404 may comprise identifying a common register address of the ICs identified as containing a part number inserted during manufacture that is known to be different for the ICs. For another example, the identification in block 404 may comprise identifying a common register address of the ICs containing power on sequence (PON sequence) data set during the installation of the ICs in the SoC, where it is known that the PON sequence data for one IC is different than the PON sequence data for another IC.

It is not necessary that the same memory address be identified for all of the ICs in block 404. For example, if it is known that a first memory address common to a first IC and a second IC contain different data for each of the first IC and the second IC, that first memory address by be identified in block 404 as the memory address to reset the SID of the second IC (as illustrated in FIG. 2A-2B or 3A-3B). If it is also known that a second memory address common to the first IC and a third IC contain different data for each of the first IC and the third IC, the second memory address may also be identified in block 404 as the memory address to reset the SID of the third IC, thus ensuring that none of the first, second, and third IC have the same SID.

Method 400 continues to block 406 where the SID for one of the plurality if ICs is reset via the shared bus based on the different data stored in the identified or more memory addresses. In an embodiment, block 406 may be accomplished as discussed above for FIGS. 2A-2B or 3A-3B by causing a new SID, "match data," and (optionally) the identified memory address to be sent to each of the plurality of ICs over the shared bus. However, it will be understood that other methods may be used in block 406 to reset the SID over the common bus.

For embodiments like that of FIGS. 2A-2B or 3A-3B, the commands sending the new SID, the "match data" and (optionally the identified memory address) to each of the ICs may be write or read commands to registers of each of the ICs. In such embodiments, sending these commands causes logic in each of the ICs to perform a comparison of the received "match data" to the data in the identified memory address, and in the case of a match, to change the SID of the IC to the new SID received by the IC. For implementations with an N number of plurality of ICs with the same SID, block 406 may be performed or executed N−1 times to change the settings of N−1 of the ICs, resulting in all N of the ICs having different SIDs before the shared bus becomes active and/r before normal operation of the SoC or PCD. Method 400 then returns.

Figure 5:
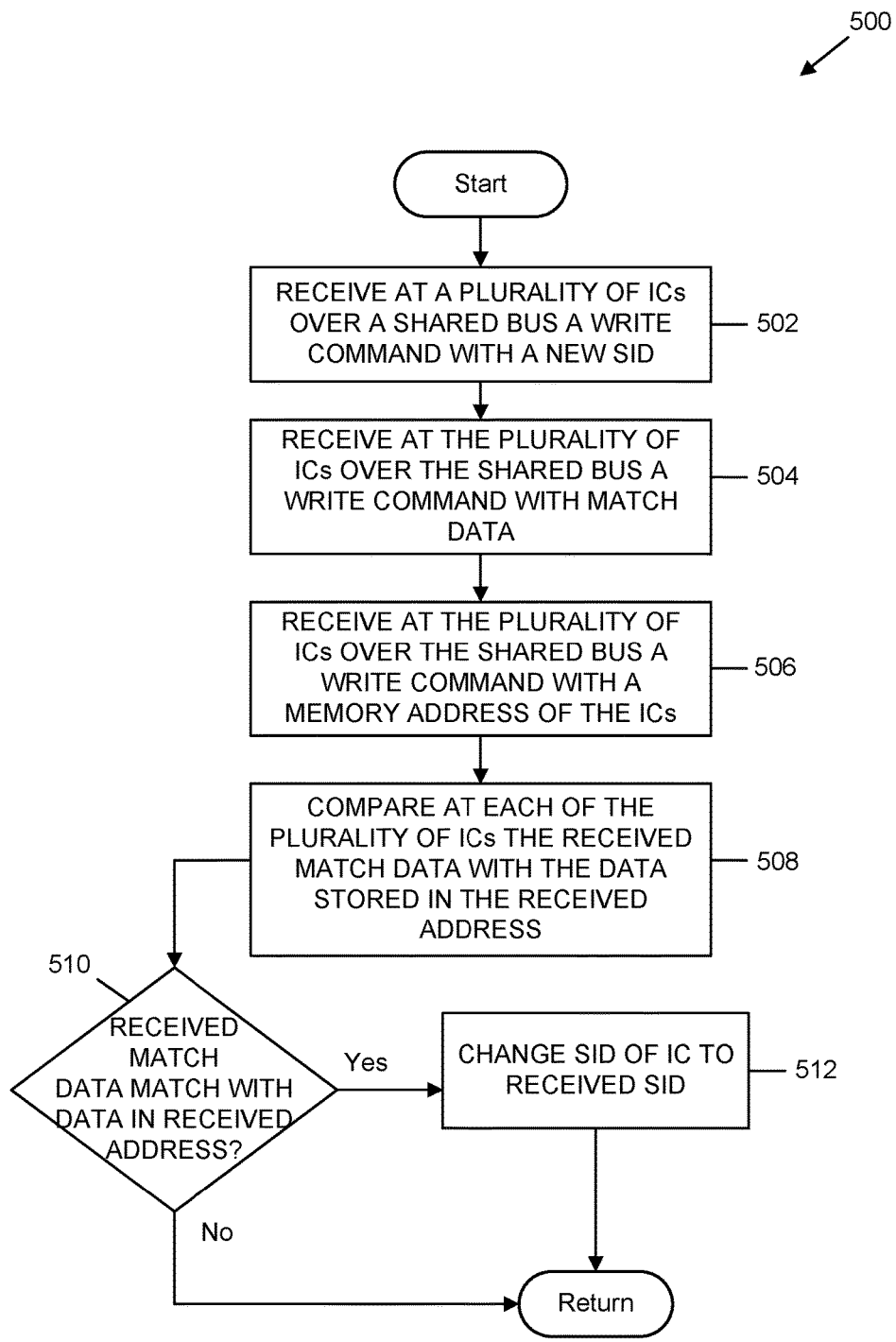
FIG. 5 is a flowchart illustrating an exemplary method that may be performed by a plurality of ICs in response to communications received at the ICs, such as communications sent in the method of FIG. 4.

Turning to FIG. 5, this figure is a flowchart illustrating an exemplary method 500 that may be performed by the plurality of ICs identified in method 400 (see FIG. 4) in response to communications sent to the ICs during method 400, such as during block 406. The exemplary method 500 may in some embodiments comprise steps or blocks that occur after the determination of a plurality of ICs in block 402 of FIG. 4. The exemplary method 500 may also comprise steps or blocks that occur after the common memory address has been identified in block 404 of FIG. 4 (whether such common memory address is known by the ICs as in FIGS. 3A-3B, or the common memory address is received by the ICs during boot up as in FIGS. 2A-2B).

Method 500 begins in block 502 where a write command with a new SID value is received over a shared bus by a plurality of ICs and the new SID value is stored in a memory of each of the ICs. In an embodiment the write command may specify a memory address of the plurality of ICs to write the new SID value, such as Register A 136a/136b of the ICs 130a/130b of FIG. 2A or Register 136a'/136b' of the ICs 130a'/130b' of FIG. 3A. In other embodiments, the write command with the new SID value may be received by additional ICs on the shared bus. The write command may be received over a shared bus, such as bus 120 (see FIG. 1) from software and/or a processing component performing the boot up.

In block 504, a write command with "match data" is received over the shared bus by the plurality of ICs and the "match data" is stored in a memory of each of the ICs. In an embodiment the write command may specify a memory address of the plurality of ICs to write the "match data," such as Register B 138a/138b of the ICs 130a/130b of FIG. 2A or Register 138a'/138b' of the ICs 130a'/130b' of FIG. 3A. In other embodiments, the write command with the new SID value may be received by additional ICs on the shared bus. The write command of block 504 may be received as part of, or at the same time as, the write command of block 502 in some embodiments. In other embodiments, the write command of block 504 may be a separate write command received either before or after the write command of block 502.

Method 500 continues to optional block 506 where a write command with a memory address is received over the shared bus by the plurality of ICs and the memory address is stored in a memory of each of the ICs. Block 506 is optional in that in some embodiments like that of FIGS. 2A-2B, the write command of block 506 is received and the received memory address is stored in the ICs, such as in Register B 138a/138b of the ICs 130a/130b of FIG. 2A.

For such embodiments, the memory address received by the ICs in block 506 is common memory address of the ICs discussed above for block 404 of FIG. 4—i.e. the memory address common to the ICs, where it is known that the multiple ICs have different data stored in that common memory address. The one or more common memory addresses received in block 506 may comprise the Register D (134a of slave IC 130a and 134b of slave IC 130b) discussed for FIGS. 2A-2B and 3A-3B above—i.e. where the data stored in Register D 134a of slave IC 130a is known to be different the data stored in Register D 134b of slave IC 130b. The write command of block 504 may be received as part of, or at the same time as, the write commands of block 502 and/or 504 in some embodiments. In other embodiments, the write command of block 506 may be a separate write command received either before or after the write command of block 502 and/or 504.

In other embodiments, like that of FIGS. 3A-3B where the common address is already known by the ICs, block 506 may not be performed and method 500 may instead move directly from block 504 to block 508. For all embodiments, each of the ICs performs a comparison in block 508 of the received "match data" of block 504 to the data stored at the common memory address of the ICs, such as Register D 132a/132b of the ICs 130a/130b of FIG. 2B or Register D 132a'/132b' of the ICs 130a'/130b' of FIG. 3B (whether the address of Register D 132a/132b or 132a'/132b' is received in block 506 or already known to the ICs). In an embodiment the comparison of block 508 is made separately by each IC, such as by logic 142a/142b of ICs 130a/130b of FIG. 2B or the logic 142a'/142b' of ICs 130a'/130b' of FIG. 3B.

In an embodiment, a determination is made at each of the ICs in block 510 whether the received "match data" is the same as, or matches, the data stored in the common memory address of the ICs (e.g. Register D 132a/132b or 132a'/132b'). In an embodiment the determination of block 510 is made separately by each IC, such as by logic 142a/142b or 142a'/142b'. The determination of block 510 may not be a separate step or block in some embodiments, but may instead be performed during or may be part of the comparison of block 508.

If the determination for an IC is that the received "match data" is not the same as, or does not match, the data stored in the common memory address (e.g. Register D 132a/132b or 132a'/132b'), the method 500 for that IC returns without further action.

If the determination for an IC is that the received "match data" is the same as, or does match, the data stored in the common memory address (e.g. Register D 132a/132b or 132a'/132b'), the method 500 for that IC continues to block 512 where the SID for that IC is changed to the value of the SID received at the IC in block 502. For example as illustrated in FIG. 2B, the received SID in Register A 136b of FIG. 2B (the value of 7 in that example) is written to Register E 132b of FIG. 2B, effectively changing the SID for slave IC 130b. Method 500 then returns.

Note that method 500 may be repeated multiple times for systems containing more than two identical ICs on the shared bus and/or containing multiple ICs with the same SID on the shared bus. In this manner the SID for any number of identical ICs may be changed over a shared bus, such as an SPMI, without need for external pins between each IC and the PCB.

Figure 6:
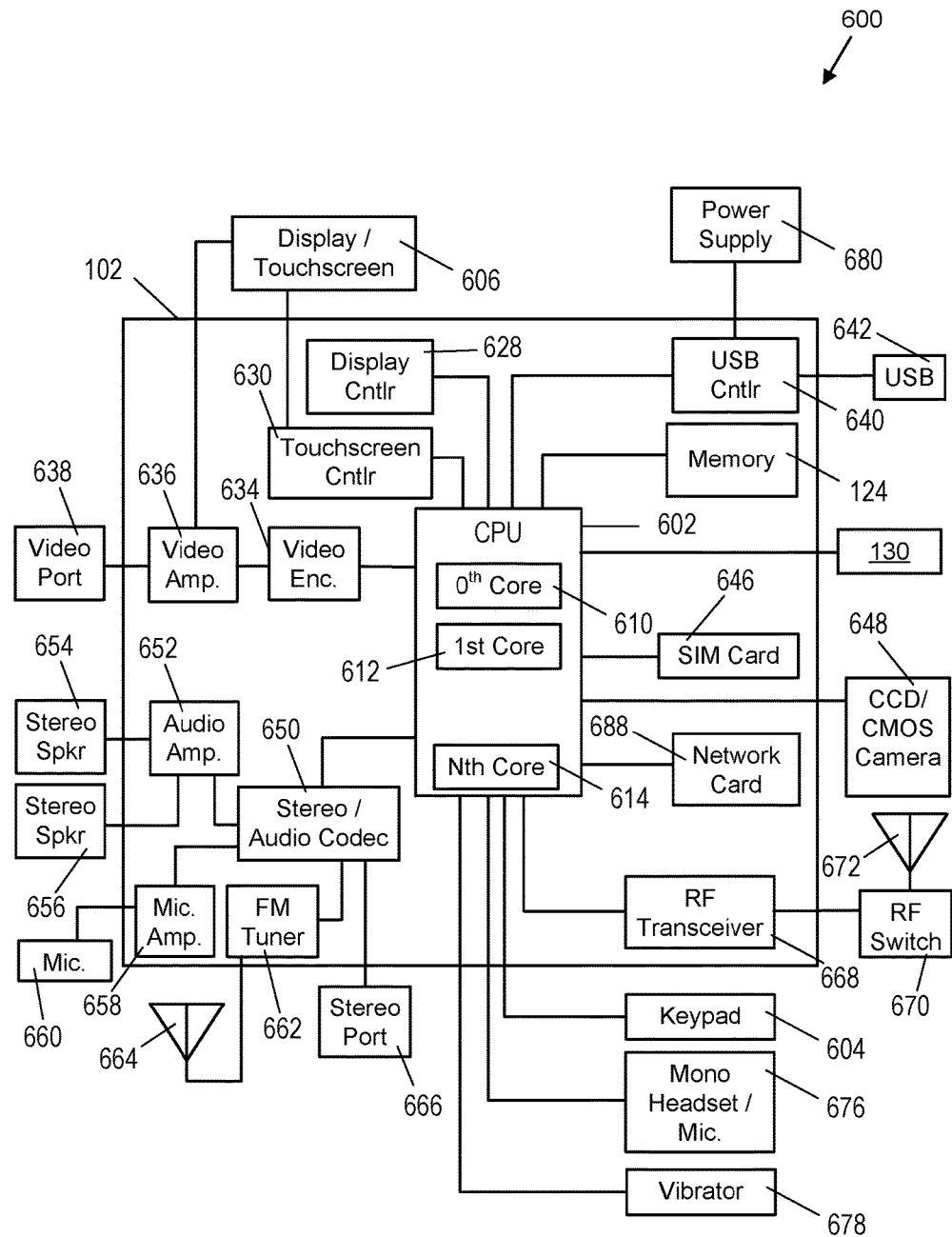
FIG. 6 is a block diagram of an exemplary computing device in which the system of FIG. 1, ICs of FIGS. 2A-2B or 3A-3B, and/or methods of FIGS. 4-5 may be implemented.

System 100 (FIG. 1), ICs 130a/130b (FIGS. 2A-2B), ICs 130a'/130b' (FIGS. 3A-3B), as well as methods 400 (FIG. 4) and/or 500 (FIG. 5) may be incorporated into or performed by any desired computing system, including a PCD. FIG. 6 illustrates an exemplary PCD 600 into which system 100, ICs 130a/130b or 130a'/130b' may be incorporated, or that may perform methods 400, and/or 500. In the embodiment of FIG. 6, the PCD 600 includes a system-on-a-chip (SoC 102) that may comprise a multicore CPU 602. The multicore CPU 602 may include a zeroth core 610, a first core 612, and an Nth core 614, which may be cores 112-116 of FIG. 1. One of the cores may comprise, for example, a graphics processing unit (GPU) with one or more of the others comprising the CPU.

A display controller 628 and a touch screen controller 630 may be coupled to the CPU 602. In turn, the touch screen display 606 external to the on-chip system 102 may be coupled to the display controller 628 and the touch screen controller 630. FIG. 6 further shows that a video encoder 634, e.g., a phase alternating line (PAL) encoder, a sequential color a memoire (SECAM) encoder, or a national television system(s) committee (NTSC) encoder, is coupled to the multicore CPU 602. Further, a video amplifier 636 is coupled to the video encoder 634 and the touch screen display 606.

Also, a video port 638 is coupled to the video amplifier 636. As shown in FIG. 6, a universal serial bus (USB) controller 640 is coupled to the multicore CPU 602. Also, a USB port 642 is coupled to the USB controller 640. Memory 112 and a subscriber identity module (SIM) card 646 may also be coupled to the multicore CPU 602.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 102. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

Referring to FIG. 6, it should be appreciated that the memory 130, touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 102 or "off chip."

It should be appreciated that one or more of the method steps described herein may be stored in the memory as computer program instructions. These instructions may be executed by any suitable processor in combination or in concert with the corresponding module to perform the methods described herein. Certain steps in the processes or process flows described in this specification naturally precede others for the invention to function as described.

However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for resetting a slave identification (SID) of an integrated circuit (IC) on a computing device, the method comprising:
    determining that a plurality of ICs in communication with a shared bus operating in a master/slave configuration have the same SID;
    identifying a common memory address of the plurality of ICs where data stored in the common memory address of a first of the plurality of ICs is different than data stored in the common memory address of a second of the plurality of ICs;
    receiving at each of the plurality of ICs over the shared bus a new SID value; receiving at each of the plurality of ICs over the shared bus a match data;
    comparing with logic at each of the plurality of the ICs the received match data with the data stored in the common memory address of the plurality of ICs; and based on the comparison, when the received match data is the same as the data stored in the common memory address, changing the SID of the IC to the received SID value.

2. The method of claim 1, wherein the plurality of ICs comprise a plurality of physically identical ICs.

3. The method of claim 1, wherein the shared bus comprises a system power management interface, and the plurality of ICs comprise power management ICs (PMICs).

4. The method of claim 1, further comprising:
prior to the comparing, receiving at each of the plurality of ICs over the shared bus a register memory address corresponding to the identified common memory address.

5. The method of claim 1, wherein:
receiving at each of the plurality of ICs over the shared bus the new SID value comprises receiving a write command with the new SID at each of the ICs during a boot up of the computing device; and
receiving at each of the plurality of ICs over the shared bus the match data comprises receiving a write command with the match data at each of the ICs during the boot up of the computing device.

6. The method of claim 1, further comprising:
identifying a second common memory address of the plurality of ICs where data stored in the second common memory address of a first of the plurality of ICs is different than data stored in the second common memory address of a third of the plurality of ICs;
receiving at each of the plurality of ICs over the shared bus a second new SID value;
receiving at each of the plurality of ICs over the shared bus a second match data;
comparing with logic at each of the plurality of the ICs the received second match data with the data stored in the second common memory address of the plurality of ICs; and
based on the comparison, if the received second match data is the same as the data stored in the second common memory address, changing the SID of the IC to the second received SID value.

7. The method of claim 6, wherein the second common memory address is different than the first common memory address.

8. The method of claim 7, further comprising:
prior to the comparing, receiving at each of the plurality of ICs over the shared bus a second register memory address corresponding to the identified second common memory address.

9. A computer system for resetting a slave identification (SID) of an integrated circuit (IC) on a computing device, the system comprising:
a shared bus of the computing device operating in a master/slave configuration;
a plurality of ICs in communication with the shared bus; and
logic of the computing device configured to determine that the plurality of ICs have the same SID and to identify a common memory address of the plurality of ICs where data stored in the common memory address of a first of the plurality of ICs is different than data stored in the common memory address of a second of the plurality of ICs,
wherein each of the plurality of ICs is configured to:
receive from the logic of the computing device over the shared bus a new SID value;
receive from the logic of the computing device over the shared bus a match data;
compare the received match data with the data stored in the common memory address; and
based on the comparison, when the received match data is the same as the data stored in the common memory address, change the SID of the IC to the received SID value.

10. The system of claim 9, wherein the plurality of ICs comprise a plurality of physically identical ICs.

11. The system of claim 9, wherein the shared bus comprises a system power management interface, and the plurality of ICs comprise power management ICs (PMICs).

12. The system of claim 9, wherein each of the plurality of ICs is further configured to:
prior to the comparing, receive from the logic of the computing device over the shared bus a register memory address corresponding to the identified common memory address.

13. The system of claim 9, wherein the determination that the plurality of ICs have the same SID and the identification of the common memory address of the plurality of ICs occurs during a boot up of the computing device.

14. The system of claim 9, wherein:
the logic of the computing device is further configured to identify a second common memory address of the plurality of ICs where data stored in the second common memory address of the first of the plurality of ICs is different than data stored in the second common memory address of a third of the plurality of ICs; and
each of the plurality of ICs is further configured to:
receive from the logic of the computing device over the shared bus a second new SID value;
receive from the logic of the computing device over the shared bus a second match data;
compare the received second match data with the data stored in the second common memory address; and
based on the comparison, if the received second match data is the same as the data stored in the second common memory address, change the SID of the IC to the received second SID value.

15. The system of claim 14, wherein the second common memory address is different than the first common memory address.

16. The system of claim 15, wherein each of the plurality of ICs is further configured to:
prior to the comparing, receive from the logic of the computing device over the shared bus a second register memory address corresponding to the identified second common memory address.

17. A computer program product comprising a non-transitory computer usable medium having a computer readable program code embodied therein, said computer readable program code adapted to be executed to implement a method for resetting a slave identification (SID) of an integrated circuit (IC) on a computing device, the method comprising:
determining that a plurality of ICs in communication with a shared bus operating in a master/slave configuration have the same SID;
identifying a common memory address of the plurality of ICs where data stored in the common memory address of a first of the plurality of ICs is different than data stored in the common memory address of a second of the plurality of ICs;
receiving at each of the plurality of ICs over the shared bus a new SID value;

receiving at each of the plurality of ICs over the shared bus a match data;
comparing with logic at each of the plurality of the ICs the received match data with the data stored in the common memory address of the plurality of ICs; and
based on the comparison, when the received match data is the same as the data stored in the common memory address, changing the SID of the IC to the received SID value.

18. The computer program product of claim 17, wherein the plurality of ICs comprise a plurality of physically identical ICs.

19. The computer program product of claim 17, wherein the shared bus comprises a system power management interface, and the plurality of ICs comprise power management ICs (PMICs).

20. The computer program product of claim 17, further comprising:
prior to the comparing, receiving at each of the plurality of ICs over the shared bus a register memory address corresponding to the identified common memory address.

21. The computer program product of claim 17, wherein:
receiving at each of the plurality of ICs over the shared bus the new SID value comprises receiving a write command with the new SID at each of the ICs during a boot up of the computing device; and
receiving at each of the plurality of ICs over the shared bus the match data comprises receiving a write command with the match data at each of the ICs during the boot up of the computing device.

22. The computer program product of claim 17, further comprising:
identifying a second common memory address of the plurality of ICs where data stored in the second common memory address of a first of the plurality of ICs is different than data stored in the second common memory address of a third of the plurality of ICs;
receiving at each of the plurality of ICs over the shared bus a second new SID value;
receiving at each of the plurality of ICs over the shared bus a second match data;
comparing with logic at each of the plurality of the ICs the received second match data with the data stored in the second common memory address of the plurality of ICs; and
based on the comparison, if the received second match data is the same as the data stored in the second common memory address, changing the SID of the IC to the second received SID value.

23. The computer program product of claim 22, wherein the second common memory address is different than the first common memory address.

24. A computer system resetting a slave identification (SID) of an integrated circuit (IC) on a computing device, the system comprising:
means for determining that a plurality of ICs in communication with a shared bus operating in a master/slave configuration have the same SID;
means for identifying a common memory address of the plurality of ICs where data stored in the common memory address of a first of the plurality of ICs is different than data stored in the common memory address of a second of the plurality of ICs;
means for receiving at each of the plurality of ICs over the shared bus a new SID value;
means for receiving at each of the plurality of ICs over the shared bus a match data;
means for comparing at each of the plurality of the ICs the received match data with the data stored in the common memory address of the plurality of ICs; and
based on the comparison, when the received match data is the same as the data stored in the common memory address, means for changing the SID of the IC to the received SID value.

25. The computer system of claim 24, wherein the plurality of ICs comprise a plurality of physically identical ICs.

26. The system of claim 24, wherein the shared bus comprises a system power management interface, and the plurality of ICs comprise power management ICs (PMICs).

27. The system of claim 24, further comprising:
prior to the comparing, means for receiving at each of the plurality of ICs over the shared bus a register memory address corresponding to the identified common memory address.

28. The system of claim 24, wherein:
the means for receiving at each of the plurality of ICs over the shared bus the new SID value comprises means for receiving a write command with the new SID at each of the ICs during a boot up of the computing device; and
the means receiving at each of the plurality of ICs over the shared bus the match data comprises means for receiving a write command with the match data at each of the ICs during the boot up of the computing device.

29. The system of claim 24, further comprising:
means for identifying a second common memory address of the plurality of ICs where data stored in the second common memory address of a first of the plurality of ICs is different than data stored in the second common memory address of a third of the plurality of ICs;
means for receiving at each of the plurality of ICs over the shared bus a second new SID value;
means for receiving at each of the plurality of ICs over the shared bus a second match data;
means for comparing with logic at each of the plurality of the ICs the received second match data with the data stored in the second common memory address of the plurality of ICs; and
based on the comparison, if the received second match data is the same as the data stored in the second common memory address, means for changing the SID of the IC to the second received SID value.

30. The system of claim 29, wherein the second common memory address is different than the first common memory address.

* * * * *